United States Patent [19]

Hayashi

[11] Patent Number: 5,073,951
[45] Date of Patent: Dec. 17, 1991

[54] METHOD OF INSPECTING AN ADHESIVE TO FASTEN A CENTER HUB TO A MAGNETIC DISK

[75] Inventor: Yoichi Hayashi, Kanagawa, Japan

[73] Assignee: Fuji Photo Film Co., Ltd., Kanagawa, Japan

[21] Appl. No.: 567,571

[22] Filed: Aug. 16, 1990

[30] Foreign Application Priority Data

Aug. 18, 1989 [JP] Japan .................................. 1-212635

[51] Int. Cl.$^5$ ............................................. G06K 9/00
[52] U.S. Cl. ....................................... 382/8; 358/106; 356/237
[58] Field of Search .......................... 382/8, 1, 26, 25; 358/101, 106; 356/237; 364/552

[56] References Cited

U.S. PATENT DOCUMENTS 4,789,238 12/1988 Ichikawa et al. .................... 356/237
4,896,040 1/1990 Nakata et al. ........................ 250/372

FOREIGN PATENT DOCUMENTS 0123229 10/1984 European Pat. Off. ................ 382/8
63-205867 8/1988 Japan .

*Primary Examiner*—Leo H. Boudreau
*Assistant Examiner*—Andrew W. Johns
*Attorney, Agent, or Firm*—Sughrue, Mion, Zinn, Macpeak & Seas

[57] ABSTRACT

A micro floppy disk generally includes a magnetic disk body which is flexible and is annular in shape and a hat-like center hub bonded to the center of the magnetic disk body by adhesive. The center hub has an annular flange portion and the adhesive is annularly applied to the flange portion of the center hub. Whether the adhesive is uniformly applied to the flange portion and whether the center hub is firmly bonded to the magnetic disk body largely affect the condition of recording reproduction of signals. Light is projected onto an area including an annular coating area on the flange portion over which the adhesive is to be applied, an area inside the coating area and an area outside the coating area, reflected light is photo-electrically detected by a surface sensor or the like, the electrical signal thus obtained is processed and subjected to connectivity analysis, and when the number of connectivity components is 3, it is determined that application of the adhesive is in a satisfactory state while when the number of connectivity components is not 3, it is determined that application of the adhesive is in an unsatisfactory state.

5 Claims, 2 Drawing Sheets

METHOD OF INSPECTING AN ADHESIVE TO FASTEN A CENTER HUB TO A MAGNETIC DISK

BACKGROUND OF THE INVENTION

1. Field of the Invention

This invention relates to a method of inspecting a floppy disk comprising a magnetic disk body and a center hub which is bonded to the magnetic disk body by adhesive, and more particularly to a method of inspecting the state of application of the adhesive.

2. Description of the Prior Art

Recently, micro floppy disks such as of 3.5 inches have come into wide use as the recording medium for office automation instruments. The micro floppy disk generally comprises a magnetic disk body which is flexible and is annular in shape and a hat-like center hub bonded to the center of the magnetic disk body by adhesive. The assembly of the magnetic disk body and the center hub is housed in a hard casing. The center hub has an annular flange portion and the adhesive is applied to the flange portion of the center hub. Whether the adhesive is uniformly applied to the flange portion and whether the center hub is firmly bonded to the magnetic disk body largely affect the condition of recording reproduction of signals. Accordingly, state of application of the adhesive to the flange portion of the center core must be carefully inspected in the manufacturing process.

In one conventional method, a light beam (containing ultraviolet rays) is projected onto the adhesive layer applied to the flange portion of the center hub, the reflected part of the light beam is received by a photo detector while mechanically moving the source of the light beam and the center hub relative to each other so that the light beam scans the flange portion, thereby photo-electrically reading light information on the state of application of the adhesive, and whether application of the adhesive is in a satisfactory state is determined on the basis of the intensity of the electrical signal thus obtained. Such a method is disclosed in Japanese Unexamined Patent Publication No. 63(1988)-205867 and will be referred to as "the first conventional method", hereinbelow.

In another conventional method, the whole center hub is exposed to light containing ultraviolet rays, the reflected light is received by a charge-coupled device in an industrial TV camera, electronically scanning the charge-coupled device, thereby obtaining an electrical signal, and whether application of the adhesive is in a satisfactory state is determined on the basis of the intensity of the electrical signal thus obtained. Such a method is disclosed in Japanese Unexamined Patent Publication No. 63(1988)-205867 and will be referred to as "the second conventional method", hereinbelow.

The first conventional method is disadvantageous in that it is difficult to effect the inspection at a high speed with a high accuracy and the cost of inspection becomes high since the light beam is caused to scan the flange portion by mechanically moving the source of the light beam and the center hub relative to each other.

In the second conventional method, whether application of the adhesive is in a satisfactory state is generally determined on the basis of the number of picture elements in a predetermined window, and accordingly, the determination cannot be correctly made unless the window is positioned with an accuracy better than 0.05 mm with respect to the material to be inspected. This gives rise to a problem that the inspection cannot be effected at a high speed.

SUMMARY OF THE INVENTION

In view of the foregoing observations and description, the primary object of the present invention is to provide a method of inspecting a floppy disk in which whether application of adhesive to the flange portion of the center hub is in a satisfactory state can be determined with a high reliability, at a high speed and at low cost.

In accordance with the method of the present invention, light is projected onto an area including an annular coating area on the flange portion over which the adhesive is to be applied, an area inside the coating area and an area outside the coating area, reflected light is photo-electrically detected by a surface sensor or the like, the electrical signal thus obtained is processed and subjected to connectivity analysis, and when the number of connectivity components is 3, it is determined that application of the adhesive is in a satisfactory state while when the number of connectivity components is not 3, it is determined that application of the adhesive is in an unsatisfactory state.

In connectivity analysis, a continuous area is counted as one connectivity component. Accordingly, when the adhesive has been uniformly applied over the coating area to form a closed annulus, the area inside the coating area and the area outside the coating area which have not been applied with adhesive are completely separated from each other by the area which has been applied with adhesive and accordingly, the number of connectivity components is 3. On the other hand, when the area which has been applied with adhesive does not form a complete annulus and is open at a part, the areas inside and outside the coating are which have not been applied with adhesive are connected by the part of the coating area which has not been applied with adhesive, and accordingly the number of connectivity components is 2.

DESCRIPTION OF THE PREFERRED EMBODIMENT

Figure 3:
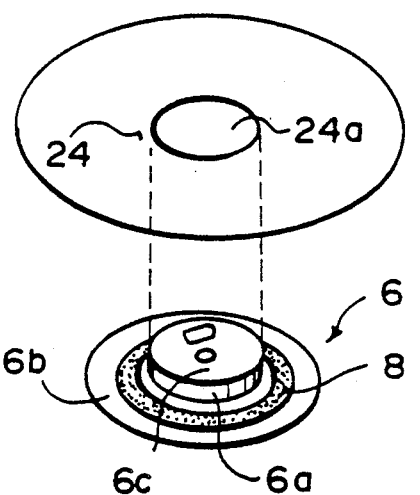
FIG. 3 is an exploded perspective view of a floppy disk to be inspected by the system shown in FIG. 1, and FIGS. 4 to 7 are views showing various states of application of adhesive.

As shown in FIG. 3, a floppy disk comprises a magnetic disk body 24 having a central opening 24a and a hat-like center hub 6 bonded to the magnetic disk body 24. The center hub 6 comprises a central core portion 6a and a flange portion 6b. The center hub 6 is bonded to the magnetic disk body 24 by adhesive 8 annularly coated on the flange portion 6b with the central core portion 6a fitted in the central opening 24a. The method of the present invention is for inspecting the state of application of the adhesive 8 to the flange portion 6b.

Figure 1:
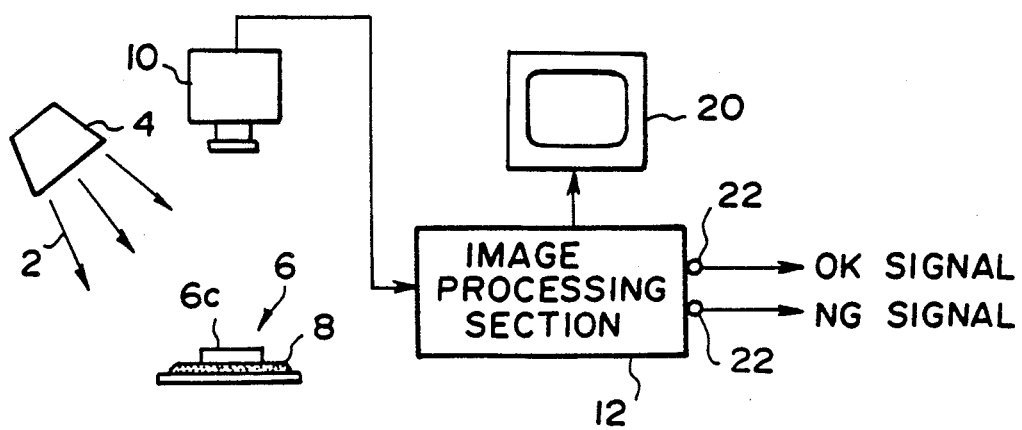
FIG. 1 is a schematic view showing an example of a system for carrying out the method of the present invention.
Figure 2:
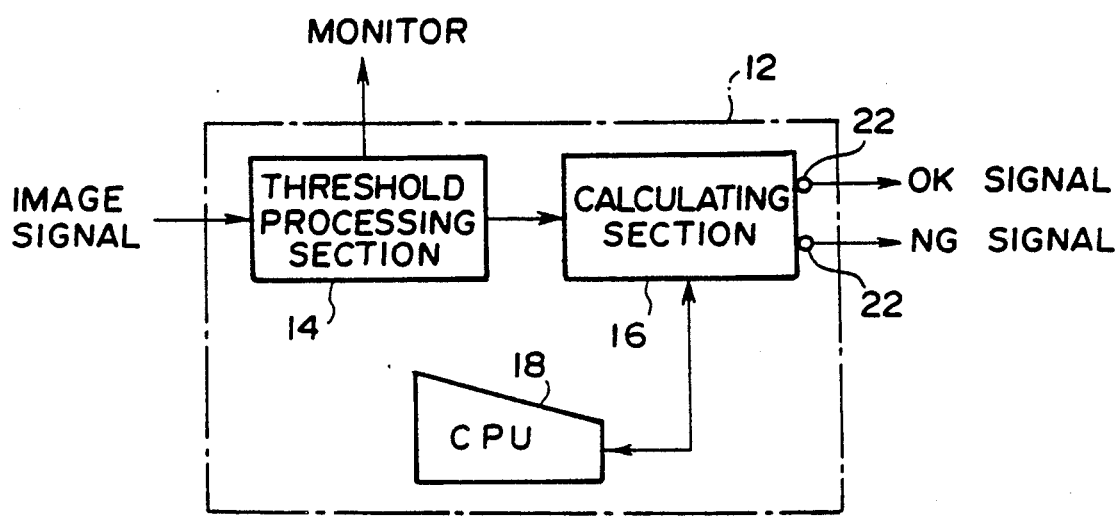
FIG. 2 is a block diagram for illustrating in detail a part of the system.

In FIGS. 1 and 2, an example of a system for carrying out the method of the present invention comprises a light source 4 for projecting light 2 onto a center hub 6 which has been applied with adhesive 8 and is placed with the side applied with the adhesive 8 facing upward, an industrial TV camera 10 which has a built-in charge-coupled device and is disposed above the center hub to receive the reflected light from the center hub 6, and an image processing section 12 which processes the image signal output from the industrial TV camera 10. As shown in FIG. 2, the image processing section 12 comprises a threshold processing section 14 which compares the level of the image signal with a reference value and binary-codes the image signal, a calculating section 16 which carries out connectivity analysis on the basis of the output of the threshold processing section 14, and a CPU 18 which controls calculation of the calculating section 16. The output of the threshold processing section 14 is also delivered to a monitor 20. The calculating section 12 is provided with terminals 22 for outputting an OK signal or an NG signal according to the result of the calculation. The industrial TV camera 10 has about 400,000 picture elements and its field is about 35 mm × 47 mm. The camera 10 can see an area covering the annular coating area on the flange portion 6b over which the adhesive is to be applied, the area inside the coating area and the area outside the coating area.

Figure 4:
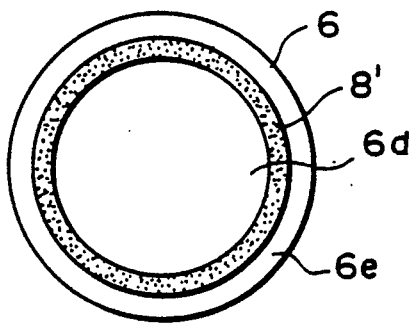
Figure 5:
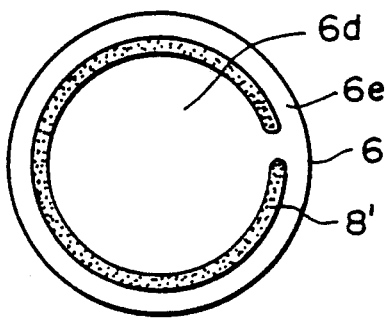
Figure 6:
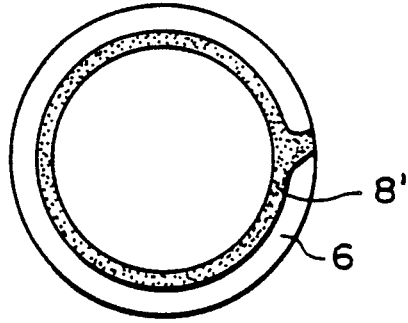
Figure 7:
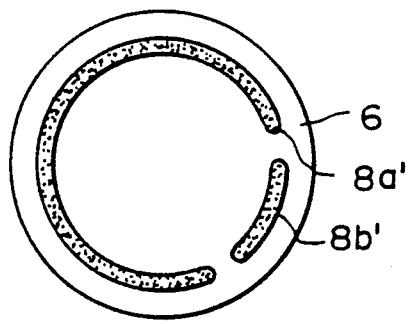

The adhesive 8 has a high absorbance and a low reflectivity a compared with the metal which forms the center hub 6. Accordingly, when the binary-coded image signal is reproduced as a visible image on the monitor 20, basically three concentric annular or circular areas, that is, a central circular area 6d corresponding to the top surface 6c of the core portion 6a and the inner peripheral portion of the flange portion 6b, an intermediate annular area 8' corresponding to the adhesive 8 and an outer annular area 6e corresponding to the outer peripheral portion of the flange portion 6b, the intermediate annular area 8' being darker than the other areas, appear as shown in FIG. 4 if the adhesive 8 has been coated on the coating area in an optimal manner. In the state shown in FIG. 4 the three areas are completely separated from each other and accordingly the number of connectivity components is 3. When application of the adhesive 8 has been unsatisfactory and the area 8' which has been applied with adhesive does not form a complete annulus and is open at a part as shown in FIG. 5, the central circular area 6d and the outer annular area 6e are connected with each other by the part at which the area 8' is open, and accordingly the number of connectivity components is 2. Though being a very rare case, when the area 8' which has been applied with adhesive is open at more than two parts, the number of connectivity components becomes more than 3. Thus it can be basically determined that application of adhesive is in the satisfactory state when the number of connectivity components is 3 and is in an unsatisfactory state when the number of connectivity components is other than 3. However when the adhesive 8 has flowed outward from the coating area to cut the outer annular area 6e as shown in FIG. 6, or when the area 8' which has been applied with adhesive is open at two parts or is divided into two areas 8a' and 8b' as shown in FIG. 7, the number of connectivity components is also 3. In order to avoid to determine that application of adhesive is in the satisfactory state in the case shown in FIG. 6 or FIG. 7, it is preferred that the area of each connectivity component be measured and it is determined that application of adhesive is in an unsatisfactory state when the area of each connectivity component largely differs from a predetermined value.

When it is determined that application of adhesive is in the satisfactory state, OK signal is output from the terminal 22 and otherwise NG signal is output from the terminal 22.

Though the light source 4 is preferably a surface light source, the light source 4 may be a line light source or a point light source. In the case where the light source 4 is a line light source or a point light source, light emitted from the light source is caused to scan an area including an annular coating area on the flange portion, an area inside the coating area and an area outside the coating area. Though, in the embodiment described above, the reflected light is received by the surface sensor in the industrial TV camera 10, a one-dimensional sensor which scans the aforesaid area may be used instead of the surface sensor.

When the adhesive 8 is transparent, it is preferred that the light source 4 be an ultraviolet source in order to enhance the contrast of the area which has been applied with adhesive to the area which has not been applied with adhesive.

Since the central area 6d need not be circular but may be annular for the purpose of connectivity analysis, it is preferred that the center portion of the central area 6d be electronically masked, whereby the storage capacity can be reduced and the signals can be processed more quickly.

The present invention can be applied to any magnetic disk so long as it has a center hub which is bonded to a magnetic disk body by adhesive.

As can be understood from the description above, in accordance with the present invention, whether application of adhesive is in the satisfactory state can be correctly inspected without positioning the center hub with a high accuracy, and accordingly the inspection can be carried out quickly with high reliability at low cost.

I claim:

1. A method of inspecting a floppy disk comprising a magnetic disk body and a center hub which has an annular flange portion and is bonded to the center of the magnetic disk body by adhesive which is to be coated over an annular coating area on the flange portion, the method being for inspecting whether application of adhesive to the flange portion of the center hub is in a satisfactory state and comprising the steps of projecting light onto an area including said annular coating area, an area inside the coating area and an area outside the coating area; photo-electrically detecting reflected light; processing the electrical signal thus obtained and subjecting it to connectivity analysis to detect connectivity components comprising regions of connected, like-valued signal components; and determining that application of the adhesive is in a satisfactory state when the number of connectivity components is 3, while determining that application of the adhesive is in an unsatisfactory state when the number of connectivity components is not 3.

2. A method as defined in claim 1 further comprising a step of determining that application of the adhesive is in an unsatisfactory state when the area of each connectivity component largely differs from a predetermined value even if the number of connectivity components is 3.

3. A method as defined in claim 1 in which said light is projected from a surface light source.

4. A method as defined in claim 3 in which said light contains ultraviolet rays.

5. A method as defined in claim 1 in which said reflected light is detected by an industrial TV camera.

* * * * *